United States Patent Office 3,407,135
Patented Oct. 22, 1968

3,407,135
REACTIVATING HYDROFORMING CATALYSTS
Henry T. Brown, Elizabeth, N.J., assignor to Esso Research and Engineering Company, a corporation of Delaware
No Drawing. Continuation-in-part of application Ser. No. 371,844, June 1, 1964. This application June 21, 1966, Ser. No. 559,119
8 Claims. (Cl. 208—139)

This application is a continuation-in-part of Brown application Ser. No. 371,844 filed June 1, 1964 now abandoned.

This invention relates to hydroforming naphthas and more particularly relates to activating and/or reactivating the catalysts used in hydroforming.

The present invention relates to improvements in hydroforming employing a platinum group metal catalyst and teaches how to maintain the halogen content of the catalyst within desired limits to maintain the catalyst at a high activity level.

With a semi-continuous or semi-regenerative hydroforming process it is necessary to periodically cut off the oil feed and regenerate the catalyst by burning with diluted air at the beginning of the regeneration. Later on, gas richer in oxygen is fed into the reactor containing the catalyst to complete the regeneration and then to reactivate or rejuvenate the catalyst.

Briefly, the process of the present invention uses three or four reactors containing catalyst. The preferred feed is a naphtha low in sulfur and unsaturated hydrocarbons. The hydroforming pressure may be between 100 p.s.i.g. and 500 p.s.i.g. The temperature during hydroforming may be between 800° F. and 1000° F. The temperature during regeneration may be between about 500 and 1000° F.

During use the catalyst which is preferably a halogen containing platinum on alumina catalyst becomes fouled with carbonaceous deposits and deactivated due to platinum crystalline growth. The alumina may be eta, gamma or other alumina. After regeneration of the catalyst to remove carbon or coke, it is important that the platinum catalyst is reactivated by treatment with a halogen such as chlorine or the like to redisperse the platinum and to replace chloride lost or stripped off the catalyst during on-oil operation in the hydroforming step and when regenerating the catalyst by burning off the carbon or coke from the catalyst. Preferably a fixed bed of catalyst is used in each reactor.

This reactivation step must be carefully controlled since catalyst halogen level affects process results in some very important ways. Increasing halogen on the catalyst improves reforming activity of the catalyst but there is a greater tendency toward coke formation, and deactivation of the catalyst is accelerated. After much experimentation it was concluded that, when using a halogen, the best overall performance could be achieved with a chloride level in the range of about 0.7 to 1.0 wt. percent on the catalyst, preferably 0.8 to 1.0 wt. percent. Furthermore, it is important that the halogen be evenly or uniformly distributed throughout all the catalyst in the reactor or reactors. The present invention is also useful in treating fresh platinum-alumina catalyst to obtain the desired halogen level on the catalyst.

Previous recommended procedures for halogen treating to obtain uniform distributed of halogen on catalyst consisted of treating the catalyst with a halogen such as chlorine in air at 975° F. in a dry atmosphere either to halogen breakthrough or with partial treats ranging from about 0.3 to 0.7 wt. percent on catalyst. However, the breakthrough treating resulted in halogen levels which were too high, namely, about 1.6–1.7 wt. percent on catalyst at breakthrough. Partial treats led to indeterminate final halogen levels and non-uniform distribution throughout the catalyst bed.

Experiments were conducted in which breakthrough treating was followed by stripping the catalyst with air containing 2% water. While this lowered the halogen to about the desired average level, there was a pronounced gradient through the catalyst bed with too little halogen at the inlet of the catalyst bed. Also, this procedure posed a potential corrosion problem to equipment due to formation of HCl and presence of HCl in the exit gas. Other methods proved ineffective in lowering catalyst halogen uptake.

Other methods included treating the catalyst with halogen and relatively large amounts of water but here again there was the problem of corrosion of equipment due to the formation of acidic gases such as HCl. Further work indicated that the desired process would use lower amounts of water to reduce both the possibilities for condensation as well as the amount of HCl formed during the treating step. The desired treating procedure should also produce a halogen level that is fairly insensitive to variations in initial catalyst halogen, as for example, after the carbon or coke burning in the catalyst regeneration step.

Emphasis in the process has centered around the developments of a commercially attractive and reproducible halogen treating procedure for consistently obtaining the desired catalyst halogen levels with the halogen content being essentially uniform throughout the catalyst bed or beds. It was discovered that reducing the temperature during chlorination or halogen treating reduces catalyst halogen retention. However, in a dry system the desired halogen level could not be obtained even at a temperature as low as 200° F. In most runs at lower temperatures (200° F.), the halogen on the catalyst was found to be loosely held halogen which appears unsuitable for adequate catalyst reactivation since mere heating resulted in loss of some halogen. It was also discovered that increasing the treat gas water content resulted in lower halogen on catalyst.

According to the present invention, a reproducible process is set forth in which the chloride content on the platinum metal catalyst is in the desired range between about 0.7 and 1.0 wt. percent on the catalyst and the chloride is uniformly distributed on the catalyst in the bed or beds and which includes as a first step presaturating the catalyst with wet oxidizing gas, that is, a gas containing water. The wet gas may be air saturated with water at a selected temperature. A gas other than air, such as nitrogen containing a small amount of oxygen, may be used. The present process teaches that once a platinum metal catalyst has been saturated with water, the amount of water present in the treating gas has only a small effect on the equilibrium water content of the catalyst. The water presaturation of the catalyst establishes an equilibrium water level on the catalyst before halogen treating in the presence of low concentrations of water.

It has been found that if a platinum catalyst is first saturated with water by using air or other gas carrier containing free oxygen at a selected temperature and a selected water content and the catalyst then treated with a gas containing a selected water content and halogen to breakthrough of the halogen, medium catalyst halogen contents of the platinum catalyst may be consistently obtained. Also the halogen is uniformly distributed over the catalyst. However, these halogen levels can only be obtained with the present process on a catalyst that has been saturated with water prior to the halogen treat.

The catalyst is first treated with an oxidizing gas at a selected temperature, between 500° F. and 800° F., and with a selected water content so as to provide 0.11 p.s.i.a. water partial pressure at the pressure of the treat. For example, at 200 p.s.i.g. this corresponds to 500 v.p.p.m. of water.

Thus, for example, if a platinum on alumina catalyst containing halogen and up to 1 wt. percent of platinum is first saturated with water at 600° F., and 200 p.s.i.g. by treating the catalyst with a wet gas carrier containing 500 v.p.p.m. of water for an extended period so that the vapor pressure of the water saturated catalyst is in equilibrium with the water partial pressure in the vapor phase or the water vapor partial pressure of the wet treat gas, this results in 500 v.p.p.m. of water in the treat gas at 600° F. and 200 p.s.i.g. This also means that the water saturated catalyst contains sufficient water so that its water vapor pressure is 0.11 p.s.i.a. (pounds per square inch absolute), corresponding to saturating air at 33° F. with water.

The next step is to take the water saturated platinum catalyst and treat it with water vapor and a halogen or halogen releasing or providing material to halogen breakthrough. "Breakthrough" will presently be defined. The amount of chlorine is 0.05 mol percent concentration, the temperature is 600° F. and the pressure is 200 p.s.i.g. Under these conditions medium catalyst chloride contents of 0.70 to 1.0 wt. percent are consistently obtained. As will be hereinafter pointed out, the conditions given above may be varied and the invention is not to be restricted to the specific example given above.

The present invention enables operators to consistently achieve the halogen level on the catalyst which has been found to give the best performance.

The process of the present invention is useful for treating a variety of catalysts, either fresh or aged, and with different platinum contents or levels. The process of the present invention is also independent of the initial halogen content of the platinum catalyst as the apparent equilibrium halogen level of the catalyst at breakthrough seems primarily a function of temperature of the treating step and the surface properties of the catalyst. The process assures a uniform chloride content of 0.7 to 1.0 wt. percent on the catalyst for a variety of commercial hydroforming catalysts using chlorine breakthrough as the criterion of when the desired level is obtained.

By "breakthrough" is meant that the water vapor or steam with the chlorine or chlorine yielding agents is passed through a platinum catalyst bed at an elevated treating temperature until chlorine or halogen is detected in the vapor or gas exiting from the catalyst bed, using a starch-iodine solution or other appropriate test for detecting the breakthrough.

Operation with the low water partial pressure (condensation temperature of 33° F.) means that corrosion of equipment in the plant from HCl stripped from the catalyst will not be a problem. Some wet runs, in which the water concentration was varied, have been made at 600° F., 0.05 mol percent $Cl_2$ concentration and at 200 p.s.i.g. In some of these runs the platinum-alumina catalyst was a fresh unused catalyst and contained 0.3 wt. percent platinum with an initial chloride level of 0.65 wt. percent and a surface area of 175 m.$^2$/gm. The fresh catalyst was first preconditioned or saturated at about 500° F. to 800° F. with water-containing gas, such as air that had been passed through a water saturation step at 33° F. to provide a wet gas, at a pressure of 200 p.s.i.g. for about 4 hours to obtain an equilibrium water level on the catalyst before chlorine or halogen treating. The time of water treatment for different catalysts was up to about 2–10 hours and was dependent on the previous history of the catalyst. The catalyst was treated until the water concentrations in the inlet gas and outlet gas were equal. The so-treated catalyst was separated into two portions for different treats.

The one portion of the water-saturated catalyst was chlorine treated with a chlorine-water stream to chlorine breakthrough with the water level being 500 v.p.p.m. in the chlorine-water treat gas. The other portion was chlorine treated to chlorine breakthrough with the water level being at 2000 v.p.p.m. in the chlorine-water treat gas. For the treat with 500 v.p.p.m. of water (fresh catalyst) the chloride catalyst level was 0.92 wt. percent (sharp chlorine breakthrough) and for the treat with 2000 v.p.p.m. of $H_2O$, the chloride catalyst level was 0.76 wt. percent. For the 500 v.p.p.m. the gas was air which was saturated with water at 33° F. and for the 2000 v.p.p.m. the gas or air was saturated with water at 72° F. The catalyst was chlorine treated to breakthrough in each case, and this was for 3.1 and 1.4 hours, respectively. The chlorine-containing gas flow rate was 9 s.c.f./hr./lb. of catalyst. The amount of chlorine was 0.05 mol percent concentration, the temperature was 600° F., and the pressure was 200 p.s.i.g.

Several additional runs were made with aged platinum catalysts with varying regeneration histories. These activation or reactivation runs were made at 200 p.s.i.g., 0.05 mol percent chlorine concentration with gas (air) and a gas flow rate of 9 s.c.f./hr./lb. of catalyst. The catalysts were first presaturated with water wet oxidizing gas by passing the wet gas over the catalyst. The wet pretreat gas was air which was saturated with water at 33° F. so that the water level in the pretreat gas (air only here) was 500 v.p.p.m. at 200 p.s.i.g. A wet chlorine treating gas (air+$Cl_2$+500 v.p.p.m. $H_2O$) was then passed over the water presaturated catalyst until there was a chlorine breakthrough. The temperature during the water presaturation step and the chlorine treating was 600° F. and the pressure was 200 p.s.i.g.

A twice-regenerated plant aged platinum-alumina catalyst having 0.3 wt. percent platinum and 0.1 wt. percent chloride gave a final chloride level of .98 wt. percent after treated as above set forth. A platinum-alumina catalyst having had 44 regenerations (0.4 wt. percent initial chloride) gave a final chloride level of 0.8 wt. percent. The surface area of this last mentioned catalyst was about 152 m.$^2$/gm. The somewhat lower final chloride level is explained by the lower surface area of the much regenerated catalyst. There was substantially no HCl found in the exit treat gases prior to chlorine breakthrough. The data obtained at 600° F. and 200 p.s.i.g. are tabulated in the following table. The chlorine concentration was 0.05 mol percent, the water presaturation temperature was 600° F., and the time of presaturation was 4–10 hours. The water in the presaturation gas was 500 v.p.p.m.

TABLE I

| | $H_2O$ in $Cl_2$ treat gas, v.p.p.m. | Chloride wt. percent on catalyst | | Surface area, m.$^2$/gm. |
|---|---|---|---|---|
| | | Before treating | After treating | |
| Fresh 0.3 wt. percent platinum catalyst | 500 | 0.65 | .92 | 175 |
| Aged 0.3 wt percent platinum catalyst (2 regenerations) | 500 | 0.11 | .98 | 175 |
| Aged 0.3 wt percent platinum catalyst (44 plant regenerations) | 500 | 0.42 | .83 | 152 |
| Fresh 0.6 wt. percent platinum catalyst | 500 | 0.72 | 1.00 | 172 |

The results in Table I indicate that at 600° F., and 200 p.s.i.g. intermediate chloride levels of 0.8 to 1.0 wt. percent for a variety of commercial platinum hydroforming catalyst can be obtained with 500 v.p.p.m. of water in the chlorine treating gas. This corresponds to 0.11 p.s.i a. water partial pressure at 200 p.s.i.g. While the procedure is independent of the initial chloride content of the platinum catalyst, these final chloride levels are only obtained on a platinum catalyst that has been saturated with water prior to the chlorine treat. Other runs were made where the water level in the chlorine treat gas was as high as 10,000 v.p.p.m. but there was little advantage shown for increasing the water level above 500 v.p.p.m. If 2,000 v.p.p.m. of water was used instead of 500 v.p.p.m. at 600° F. and 200 p.s.i.g., the catalyst chloride level was 0.7.

With a dry platinum catalyst at the conditions used in the above Table I, namely, 200 p.s.i.g., 0.05 mol percent $Cl_2$, 9 s.c.f./hr./lb. of catalyst, 600° F. and using 2000 v.p.p.m. water in the chlorine treat, it was not possible to get below 1.4 wt. percent $Cl_2$ on the catalyst. Raising the water to 10,000 v.p.p.m. under the same conditions, a chloride level of 1.1 wt. percent was obtained, but in this case the amount of chloride in the effluent gas stream prior to chlorine breakthrough was much higher (about 20–100 v.p.p.m.) primarily in the form of HCl and this would raise the problem of corrosion of the equipment. However, it does provide a way of increasing the chloride level.

The catalyst at a temperature between about 500° F. and 800° F. can be saturated with water using air saturated at a temperature between about 33° F. and 100° F. This amounts to about 500–5,000 v.p.p.m. of water in the air at 200 p.s.i.g.

These intermediate chloride levels cannot be obtained at higher temperatures such as 975° F. at a chlorine concentration of 0.05 mol percent even when water concentrations as high as 20,000 v.p.p.m. are used. Thus, it appears that the apparent equilibrium chloride level of the platinum-alumina catalyst at breakthrough seems primarily a function of the temperature of the treat and the surface properties of the catalyst which affect the water saturation level.

The temperature can be varied to adjust chloride content to various levels. These results, however, are obtained only if the catalyst is presaturated with water before treating at the lower temperature between about 500° F. and 800° F., preferably 700° F., and this is the preferred process. Using the same amount of water and the same chlorine concentration, less chloride (about 0.8 wt. percent) remains on the catalyst at the lower temperature of 500° F. and more chloride (about 1.0+ wt. percent) remains on the catalyst at the higher temperature. Intermediate chloride catalyst levels (0.7 to 1.0 wt. percent) are then obtained with a minimum of water in the chlorine treating gas stream thereby substantially reducing the possibilities for corrosion (no HCl is present in the exit stream). Treating at lower temperatures with dry or wet gases proved unsatisfactory since the chlorine adsorbed on the catalyst was very loosely held. At higher temperatures, medium chloride levels were only obtained with very high water concentrations and high concentrations of HCl were found in the exit gases. These results are shown in Table II where the catalyst was fresh platinum on alumina hydroforming catalyst which had not been used in a hydroforming or other hydrocarbon treating process.

TABLE II

| Catalyst | Catalyst chloride content, wt. percent | | |
|---|---|---|---|
| | Dry | Dry | Presaturated [1] |
| $Cl_2$ treat gas, $H_2O$, v.v.p.m. | Dry | 5,000 | 500 |
| Temp., °F.: | | | |
| 975 | 1.6–1.7 | 1.3–1.4 | 1.6 |
| 800 | 1.4 | 1.2 | 1.1–1.3 |
| 600 | 1.2 | 1.1 | 0.75–1.0 |
| HCl in exit gas, v.p.p.m. | 0 | 20–100 | [2] 0 |

[1] Presaturated at 600° F. with 500–5,000 v.p.p.m. $H_2O$.
[2] 600° F. only.
Other treating conditions: 200 p.s.i.g., 9 s.c.f./hr./lb. of catalyst, 0.05 mol percent chlorine, 6% oxygen and 94% nitrogen.

Low temperature (600° F.) chlorine treating has been tested in a pilot plant and found to give good process results. Chlorine treating at 600° F. and 200 p.s.i.g., in the presence of 0.05 mol percent water, of a water presaturated platinum catalyst gave a chloride content on the platinum-alumina catalyst of 0.8–0.9 wt. percent after chlorine breakthrough. Following this, the catalyst was reduced with hydrogen at 800° F. and then dried with dry hydrogen. Catalyst reactivated in this manner gave excellent activity for the measured chloride content, and better activity maintenance than that obtained when using previous procedures. The procedure has also been tried commercially and has been found to be successful in obtaining intermediate chlorides on platinum hydroforming catalyst.

One method of utilizing the new chlorination procedure is to incorporate it in the semi-regenerative hydroformer regeneration procedure. After the coke or carbon is burned off of the catalyst, the oxygen in the regenerating gas is increased to 20% and the temperature of the catalyst in the reactor or reactors is reduced to 600° F. The pressure is 200 p.s.i.g. The catalyst at this temperature is then equilibrated with regenerating gas having a water partial pressure of 0.11 p.s.i.a. Then each reactor at this temperature is indivdually treated to breakthrough with chlorine and water partial pressures of 0.11 p.s.i.a. each. This is followed by a short air treat at 975° F. Oxygen is removed from the reactors by purging and oxides are reduced by using a hydrogen treat, first at 800° F. and then at a higher temperature up to 975° F. The reactor beds are then cooled to 800° F. prior to introducing oil for the hydroforming step.

In one pilot plant run where the feed was a virgin naphtha having a boiling point range of about 160 to 350° F., the catalyst was a platinum on alumina extruded catalyst containing 0.3 wt. percent platinum arranged in fixed beds. The catalyst at 600° F. and 200 p.s.i.g. was presaturated with water by using air containing 500 v.p.p.m. of water for about 9 hours. The presaturated catalyst was then treated at 600° F. and 200 p.s.i.g. with chlorine-containing air and water to chlorine breakthrough. The chloride on the catalyst at the beginning of the run was in the lower portion of the range (0.8 wt. percent). The water in the chlorine treat gas was at a partial pressure of .11 p.s.i.a.

The temperature during hydroforming was raised from 920 to 975° F. over a 3½ month period. The pressure was maintained at about 500 p.s.i.g. About 7000 s.c.f. of hydrogen per barrel of feed were used. The w./hr./w. feed rate was about 1.3. The run was continued over 3 months. The hydroformed product—vol. percent $C_5+$ hydrocarbons on naphtha feed—was 68% with a Research octane number of 98.

A second pilot plant run was made under the following conditions:

Hydroforming temperature _____° F__ 915–965
Hydroforming pressure _____p.s.i.g__ 500
Oil feed rate w./hr./w. _____ 1.45
S.c.f. of $H_2$ rich gas per barrel of feed _____ 7,000

The naphtha feed was an Arabian Zelten virgin stock having a boiling range of 160 to 350° F. and containing 26% naphthenes, 61% paraffins, and 13% aromatics. The catalyst was an extruded 0.6 wt. percent platinum on alumina which was coked and then regenerated. The catalyst was charged to the semi-regenerative unit and then was reactivated using the present invention for obtaining intermediate chloride contents of about 0.9 wt. percent. This involved presaturating the catalyst at 600° F. using air containing 500 v.p.p.m. water at 200 p.s.i.g. Breakthrough chlorine treating of each reactor was then done at 600° F. and 200 p.s.i.g. with air containing .05 mol percent chlorine and 500 v.p.p.m. water. Other operating conditions were typical for semi-regenerative reactivation, 200 p.s.i.g. and the flow rate of the chlorine containing water vapor was 9 s.c.f./hr./lb. of catalyst. The catalyst was treated with air and then treated with hydrogen at 800° F. The catalyst was then dried and inspected for chloride content before going on oil.

The chlorine treated platinum catalyst contained 0.9 wt. percent chlorine with practically no variation in the average level from reactor to reactor and the gradient within any reactor was less than 0.2 wt. percent. This run was deliberately terminated after operating over 7 months.

The average cycle yield of 96 octane number hydroformate C₅+ yield vol. percent on naphtha feed was 71.7 liquid volume and the hydrogen yield was 1.16 wt. percent and the w./hr./w. was 1.45. These are excellent process results.

Comparative results of the old process and that of the present invention are given in Table III.

TABLE III

| Catalyst reactivation | 0.3% Platinum | | 0.6% Platinum | |
| --- | --- | --- | --- | --- |
| | Old | This invention | Old | This invention |
| Feed, °F | ¹ 160/350 | ² 160/350 | ¹ 160/350 | ² 160/350 |
| Initial chloride | 1.2 | 0.80 | 1.1 | 0.90 |
| RON | 96 | 98 | 96 | 97 |
| Run length, mo | ³ 1 | 3 | ³ 5+ | 7+ |
| Results, Average: | | | | |
| Average temp., °F | 910 | 943 | 926 | 936 |
| C₅+ yield at run RON | 69.5 | 68.4 | 69.8 | 71.7 |
| H₂ yield, wt. percent | 0.76 | 1.13 | 0.85 | 1.16 |
| H₂ p.p., p.s.i.a | 265 | 385 | 271 | 299 |

¹ Arabian.
² Arabian/Zelten.
³ Runs terminated because of excessive catalyst deactivation.

The "Old" reactivation procedure in Table III included chlorination at 975° F. of dry catalyst using nominally dry chlorine gas.

With the present invention the benefits, as shown in Table III, are increased octane number and better selectivities (C₅+ and H₂ yields) of the hydroformate product and/or increased run length at existing commercial units and reduced catalyst requirements for new hydroforming units.

In another example a catalyst comprising platinum on alumina containing 0.3 wt. percent platinum was treated as follows: The catalyst was presaturated with air containing 500 v.p.p.m. of water at 200 p.s.i.g. for about 15 hours. The presaturated catalyst was then treated at 700° F. with chlorine-containing air and water at a partial pressure of 0.11 p.s.i.a. to chlorine breakthrough. The chloride on the catalyst was 0.98 wt. percent. This thus-treated catalyst was used in a typical reforming operation. This example illustrates the phenomenon above mentioned that using the same amount of water and the same chlorine concentration, a higher temperature within the range given results in higher chloride on the catalyst.

The procedure to be used during regeneration of a platinum on alumina hydroforming catalyst containing 0.1 to 1.0 wt. percent platinum includes first discontinuing the flow of oil feed and recycle gas to the reactors. The fixed bed catalyst in the reactors is then purged with an inert gas such as nitrogen. The purging gas is used to remove volatile hydrocarbons which are adsorbed or absorbed on the catalyst in the several catalyst beds.

Following the purging step, air is mixed with hot flue gas to the extent that at the beginning of the regeneration operation the concentration of the oxygen in the regeneration gas is low, that is about 0.3 to 0.8 mol percent. The temperature during regeneration is between about 800° F. and 1000° F. Regeneration is continued until there is a breakthrough of oxygen and this will usually take between about 6 and 12 hours. The catalyst is then purged with nitrogen gas to remove oxygen-containing gas and combustion gases including water.

After the catalyst is regenerated, the oxygen content is increased to 20% and the temperature of the catalyst beds is reduced to 600° F. by blowing air through the catalyst beds. The catalyst is then treated at 600° F. at 200 p.s.i.g. with a gas such as air saturated with water at 33° F. to obtain an equilibrium water level on the catalyst before chlorine treating as found in the exit gases leaving the reactor. In this case the water partial pressure of the chlorine treat gas was 0.11 p.s.i.a.

Instead of using water to saturate the air, the required amount of steam may be injected into the air to maintain 0.11 p.s.i.a. partial pressure of water during the water saturation step and chlorine treating step.

Then the catalyst in each reactor is individually treated to breakthrough with chlorine and water partial pressure of 0.11 p.s.i.a. each at 600° F. and 200 p.s.i.g.

The catalyst in each bed is then treated with air at 975° F. for about 2 hours to treat the catalyst. The catalyst bed is raised to 975° F. while circulating air with the drier in the circuit.

The flow of air is stopped and the catalyst beds are purged with an inert gas such as nitrogen.

The catalyst beds are then treated with hydrogen or hydrogen-containing gas at about 975° F. The catalyst beds are then cooled to 800° F. with circulating hydrogen-containing gas before naphtha is fed in for the next run.

In operation, if necessary, a drier may be used to control the water content of the gas in the system prior to and during chlorination. The catalyst in the reactors is preconditioned with water before chlorination. The chlorination is done under controlled conditions of water and chlorine at a partial pressure of each of 0.11 p.s.i.a. Or the catalyst can be wet by injecting steam under pressure into the reactor at a partial pressure of water of 0.11 p.s.i.a. before the chlorination step. The amount of steam is equivalent to about 500 v.p.p.m. of water in the gas under these temperature and pressure conditions.

The platinum in the catalyst may be varied between about 0.1 and 1.0 wt. percent.

The concentration of hydrogen in the hydrogen-containing recycle gas is between about 35 and 90 vol. percent.

The naphtha feed may be a virgin naphtha, a cracked naphtha or mixtures thereof.

The catalyst at a temperature between about 500° F. and 800° F. can be saturated with water using air saturated with water at a temperature between about 33° F. and 100° F. This is equivalent to about 500–5000 v.p.p.m. of water in the gas.

The amount of chlorine in the treating gas (air) may vary between about 0.02 and 1.0 mol percent.

The amount of water in the treating gas (air) containing chlorine may be between about 200 and 10,000 v.p.p.m. and the water temperature changed correspondingly using the higher temperatures for the higher amounts of water.

The pressure during water saturation of the catalyst and the chlorine treatment of the catalyst may be between 0 and 400 p.s.i.g.

Instead of air as a gas carrier to be used with chlorine and water, other oxidizing gases such as nitrogen containing oxygen can be used.

The gas flow rate of the chlorine-containing gas can be between about 3 and 30 standard cubic feet per hour per pound of catalyst (s.c.f./hr./lb. of catalyst).

The time of treatment with the chlorine-containing gas can be between about 0.5 and 10 hours.

The temperature during chlorine treating and water presaturation step may be between about 500° F. and 800° F., preferably 700° F. and the pressure between 100 and 400 p.s.i.g.

In a specific case where the platinum catalyst was presaturated with water at 200 p.s.i.g., the treating gas contained chlorine, oxygen, nitrogen and water and was used in the flow rate of 9 s.c.f./hr./lb. of catalyst; the chlorine was present in 0.05 mol percent, the oxygen in 6.0 mol percent and the nitrogen 94 mol percent. Other experiments were carried out using only chlorine and air in admixture.

The ratio of chlorine to water in the treating gas may be between about 1/1 and 1/50 by volume.

Higher temperatures during the chlorine treating step using the same amount of water and the same chlorine concentration results in higher chloride levels on the catalyst above 1.0 wt. percent. This may be desirable in some cases to compensate for chloride lost during the steps in regeneration of the catalyst or other treating steps of the catalyst such as hydrogen reduction.

For the chlorine treating step elemental chlorine may be used. Instead of elemental chlorine, organic chlorine containing compounds or agents which liberate or release chlorine on decomposition at the temperature used in chlorine treating may be used. Chlorine providing materials or agents which are readily decomposed under the treating conditions to give off chlorine may be used. Carbon tetrachloride is one example of an organic chlorine containing compound. Or trichloroethylene may be used.

When using carbon tetrachloride the selected amount is injected into the wet air to give an amount of chlorine equivalent to 0.2 to 1.0 mol percent in the air when using elemental chlorine.

While the water partial pressure of 0.11 p.s.i.a. is preferred for the water saturation step and the chlorine treating step, the water partial pressure may be varied between about 0.04 p.s.i.a. (200 v.p.p.m. $H_2O$) and 2.0 p.s.i.a. (10,000 v.p.p.m. $H_2O$). The narrower range of 500 v.p.p.m. to 5000 v.p.p.m. of water is preferred.

Changing the water in the treat gas at the same pressure, changes the partial pressure of water from 0.11 p.s.i.a. to a different figure as shown above. Changing the pressure and maintaining the water partial pressure at 0.11 p.s.i.a., requires changing the water concentration in the treat gas.

What is claimed is:

1. In the hydroforming of naphthas in the presence of a halogen-containing catalyst comprising a platinum group metal supported on alumina in which a naphtha is contacted with a fixed bed of catalyst in the presence of hydrogen under hydroforming conditions of temperature, pressure and contacting time and then regenerated, the improvement which comprises treating the regenerated catalyst by chlorinating the catalyst to a chlorine level between about 0.70 and 1.00 wt. percent on the catalyst by first treating said catalyst at an elevated temperature of about 500° F.–800° F. and a pressure between about 0 and 400 p.s.i.g. with a water-containing treat gas which is saturated with water so as to contain 500–5000 v.p.p.m. of water until the partial pressure of the water in said catalyst is at equilibrium with said gas and then passing through said fixed bed of water saturated catalyst a gas containing 0.02 to 1.0 mol percent chlorine, .02 to 1.0 mol percent water, 0 to 21 mol percent oxygen and nitrogen at an elevated temperature of about 500° F.–800° F. at a treating gas rate of 3 to 30 s.c.f./hr./lb. of catalyst and under a pressure of between 0 and 400 p.s.i.g. until chlorine breakthrough and chlorine gas is detected in the exiting gas.

2. A process according to claim 1 wherein the temperature of said catalyst is 700° F., the treat gas is air saturated with water and contains 500 v.p.p.m. of water, the pressure at which the water treatment takes place is 200 p.s.i.g., the gas containing chlorine contains 0.05 mol percent chlorine and the flow rate of the gas is 9 s.c.f./hr./lb. of catalyst, the chlorine treating is done in the presence of 500 v.p.p.m. of water at 600° F. under a pressure of 200 p.s.i.g.

3. A method of reactivating a regenerated platinum group metal on alumina catalyst containing halogen to a chlorine level between about 0.70 and 1.0 wt. percent on said catalyst by first water saturating a platinum on alumina catalyst containing halogen by treating said catalyst with an oxidizing gas containing 500–5000 v.p.p.m. of water at a temperature between about 500° F. and 800° F. for a sufficient time to bring the water vapor pressure of the gas and said catalyst into equilibrium, then treating said water saturated catalyst with a gas containing 0.02 to 1.0 mol percent chlorine and between 200 and 10,000 v.p.p.m. of water at a temperature between 500 and 800° F. until there is a breakthrough of chlorine in the exit gas.

4. A method according to claim 3 wherein said water in said oxidizing gas comprises steam under pressure to supply water vapor in an amount between about 500 and 5000 v.p.p.m.

5. In the hydroforming of naphthas in the presence of a platinum group metal supported on alumina catalyst containing halogen in which a naphtha is contacted with a catalyst is the presence of hydrogen under hydroforming conditions of temperature, pressure and contacting time, the improvement which comprises chlorinating the platinum group metal catalyst to a chlorine level between about 0.80 and 1.00 wt. percent on the catalyst by first water saturating the catalyst at a temperature of about 600° F. and 200 p.s.i.g. by treating the catalyst with air containing water vapor for a sufficient time so that the catalyst contains sufficient water to have a water vapor pressure of 0.11 p.s.i.a., then contacting the water saturated catalyst with a gas containing chlorine and water vapor at a temperature of about 600° F. and a pressure of 200 p.s.i.g. until chlorine breakthrough and there is between about 0.80 and 1.0 wt. percent of chlorine substantially uniformly distributed on the catalyst.

6. A method of activating a platinum on alumina catalyst which comprises first saturating air with water vapor at a temperature between about 33° F. and 100° F., then saturating a platinum on alumina catalyst with water by treating the catalyst wtih said water saturated water by treating the catalyst with said water saturated air at a temperature between 500° F. and 800° F., and a pressure between 100 and 400 p.s.i.g. so that the vapor pressure of the water in the catalyst at equilibrium with the water saturated air is between 0.04 and 2.0 p.s.i.a., then contacting said water saturated catalyst with a water containing treating gas containing between about 200 and 10,000 v.p.p.m. of water and a volatile decomposable halogen material providing chlorine under treating conditions in an amount between about 0.02 and 1.0 mol percent of chlorine until chlorine breakthrough so that about 0.70 to 1.0 wt. percent of chlorine is substantially uniformly distributed on said catalyst, the time of the water presaturation step being between about 2 and 10 hours, the time of treatment with the chlorine-water containing gas being between about 0.5 and 10 hours and the temperature during the water presaturation step and the chlorine treating step being between 500° F. and 800° F.

7. A method according to claim 6 wherein said decomposable halogen comprises carbon tetrachloride.

8. A method for treating platinum on alumina catalysts containing halogen which comprises saturating a platinum on alumina containing halogen catalyst with water by contacting said catalyst with air saturated with water at a temperature of at least 500° F. and a pressure of at least 200 p.s.i.g. until the partial pressure of the water in said catalyst is at equilibrium with said air, said air having been presaturated with water at 33° F. so that it contains 500 v.p.p.m. of water at 600° F. and a pressure of 200 p.s.i.g., then treating said water saturated catalyst with a gas containing 0.05 mol percent chlorine and 500 v.p.p.m. (at 600° F.) of water at a temperature of at least 500° F. and a pressure of at least 200 p.s.i.g. until there is a chlorine breakthrough in the exit gas.

References Cited

UNITED STATES PATENTS

| | | | |
|---|---|---|---|
| 2,916,440 | 12/1959 | Hogin et al. | 208—139 |
| 2,981,694 | 4/1961 | Engel | 252—420 |
| 3,134,732 | 5/1964 | Kearby et al. | 252—415 |
| 3,173,857 | 3/1965 | Haensel | 208—139 |

DELBERT E. GANTZ, *Primary Examiner.*

H. LEVINE, *Assistant Examiner.*